United States Patent
Luijten et al.

(10) Patent No.: US 7,145,873 B2
(45) Date of Patent: Dec. 5, 2006

(54) SWITCHING ARRANGEMENT AND METHOD WITH SEPARATED OUTPUT BUFFERS

(75) Inventors: Ronald P. Luijten, Horgen (CH); Cyriel Minkenberg, Adliswil (CH); Norbert Schumacher, Neuhausen (DE); Juergen Koehl, Schoenbuch (DE); Bernd Leppla, Buchen-Boedigheim (DE)

(73) Assignee: International Business Machines Corporation, Armonk, NY (US)

( * ) Notice: Subject to any disclaimer, the term of this patent is extended or adjusted under 35 U.S.C. 154(b) by 1198 days.

(21) Appl. No.: 09/965,588

(22) Filed: Sep. 27, 2001

(65) Prior Publication Data

US 2002/0118689 A1 Aug. 29, 2002

(30) Foreign Application Priority Data

Sep. 27, 2000 (EP) .................................. 00121004

(51) Int. Cl.
*H04J 1/16* (2006.01)
*H04L 12/28* (2006.01)

(52) U.S. Cl. ..................... 370/230; 370/235; 370/412
(58) Field of Classification Search ............... None
See application file for complete search history.

(56) References Cited

U.S. PATENT DOCUMENTS

| 5,838,677 | A * | 11/1998 | Kozaki et al. ............... 370/389 |
| 6,046,997 | A | 4/2000 | Fan |
| 6,144,662 | A * | 11/2000 | Colmant et al. ............. 370/390 |
| 6,249,524 | B1 * | 6/2001 | Moriwaki et al. ........... 370/412 |
| 6,570,879 | B1 * | 5/2003 | Kikuchi .................. 370/395.21 |
| 6,907,001 | B1 * | 6/2005 | Nakayama et al. .......... 370/230 |
| 6,944,170 | B1 * | 9/2005 | Minkenberg ................ 370/411 |
| 6,977,941 | B1 * | 12/2005 | Takahashi et al. ........... 370/412 |

FOREIGN PATENT DOCUMENTS

| EP | 0 748 087 A1 | 12/1996 |
| EP | 0 492 025 B1 | 8/1997 |
| EP | 0 838 972 A2 | 4/1998 |

OTHER PUBLICATIONS

Patent Abstracts of Japan, Publication No.: 10-126419, dated May 15, 1998.
Patent Abstracts of Japan, Publication No.: 04-175034, dated Jun. 23, 1992.

(Continued)

*Primary Examiner*—Andrew C. Lee
(74) *Attorney, Agent, or Firm*—Douglas W. Cameron

(57) ABSTRACT

The invention proposes a switching arrangement for transporting data packets which comprise a data packet destination information and a payload, to one or more output ports. The switching device is able to route the arriving data packets according to the data packet destination information, to at least one dedicated of the output ports. It comprises at each input port an input buffer with at least as many single input queues as there are output ports, and an input controller for each input port, serving for controlling the order of multiplexing the data packets from the input queues of the corresponding input buffer to the switching device. The total of input ports is divided up into several subsets of input ports. Each subset in the switching device has its separate output buffer for storing at addresses therein at least the payload of each data packet arriving at the input port. At least one set of as many output queues as the switching arrangement has output ports are arranged. In these output queues at least the address of each payload stored in the output buffer is stored, sorted according to the data packet destination information. The stored payload is then deliverable to its dedicated at least one output port under use of the stored addresses.

16 Claims, 2 Drawing Sheets

OTHER PUBLICATIONS

Patent Abstracts of Japan, Publication No.:2000-349765, dated Dec. 15, 2000.
Patent Abstracts of Japan, Publication No.: 2000-261438, dated Sep. 22, 2000.

W.E. Denzel, et al.; A Flexible Shared-Buffer Switch for ATM at Gb/s Rates; Computer Networks and ISDN Systems 27 (1995) pp. 611-624.

* cited by examiner

SWITCHING ARRANGEMENT AND METHOD WITH SEPARATED OUTPUT BUFFERS

The invention relates to a switching arrangement for packets of data, with several input ports and several output ports and which is determined for the transportation of incoming packets to one or more designated of the output ports and from there to a subsequent device. More particularly it relates to a switching arrangement and method wherein the output buffer is separate for each input port or each subset of input ports. As data packets, particularly ATM cells or also Ethernet frames can be accepted.

TECHNICAL FIELD AND BACKGROUND OF THE INVENTION

Fast switching of information, be it samples of analog signals or alphanumeric data, is an important task in a communication network. The network nodes in which lines or transmission links from various directions are interconnected for exchanging information between them are often the cause of delay in the transmission. If much traffic is concentrated in a node, and if in particular most of the traffic passes through only few of the links, increased delays or even loss of information are often encountered. It is therefore desirable to have switching nodes which allow fast routing.

In EP 312628 is described a switching apparatus for interconnecting a plurality of incoming and outgoing transmission links of a communication network, or for exchanging data between incoming and outgoing computer- and workstation connection links. Furthermore, known packet formats are described.

An overview over prior art switching technology is given on the Internet page www.zurich.ibm.com/Technology/ATM/SWOCPWP, wherein an introduction into the PRIZMA Chip is illustrated. Another source for information about this topic is the publication "A flexible shared-buffer switch for ATM at Gbit/s rates" by W. E. Denzel, A. P. J. Engbersen, I. Iliadis in Computer Networks and ISDN Systems, (0169-7552/94), Elsevier Science B.V., Vol. 27, No. 4, pp. 611–624.

The PRIZMA chip comprises a shared common output buffer has 16 input ports and 16 output ports which provide a port speed of 300–400 Mbit/s. The switch's principle is first to route incoming packets through a fully parallel I/O routing tree and then to queue the routed packets in the output buffer. In addition to this, the chip uses a separation between data (payload) and control (header) flow. Only the payloads are stored in a dynamically shared output buffering storage. With this architecture, head-of-the-line-queuing is avoided. The PRIZMA chip has a scalable architecture and hence offers multiple expansion capabilities with which the port speed, the number of ports and the data throughput can be increased. These expansions can be realized based on a modular use of the PRIZMA. Also single-stage or multi-stage switch fabrics can be constructed in a modular way.

The PRIZMA chip is especially suited for broadband telecommunications, based on ATM, i.e. the Asynchronous Transfer Mode. However, the concept is not restricted to ATM-oriented architectural environments. ATM is based on short, fixed-length packets, often called cells and is supposed to be applied as the integrated switching and transmission standard for the future public Broadband Integrated Services Digital Network (BISDN). PRIZMA's topology and queuing arrangement for contention resolution employs a high degree of parallelism. The routing function is performed in a distributed way at the hardware level, referred to as self-routing. ATM packets are classified into several packet types, particularly packet types with different payload sizes, and the PRIZMA chip is dedicated to handle packets with a payload up to 64 bytes. However, also packet payloads with 12, 16, 32 or 48 bytes are often to be transported.

The bandwidth through the shared memory of an output-queued switch with N ports, must equal N times the individual port speed, which poses significant implementation concerns at high line rates. Because of this, input-queued switches have gained popularity in recent years. The performance limitations of FIFO-queued crossbar-based switches have been largely overcome by applying techniques such as virtual output queuing (VOQ), combined with centralized scheduling to achieve good throughput. VOQ entails the sorting of incoming packets at the input side based on the packet's destination output.

Packet switches that rely solely on output queuing are not well scalable to high data rates because of the high memory bandwidth requirement. Implementations that use a high degree of parallelism can achieve the desired bandwidth, but limit the amount of memory that can be integrated on a single chip, thus potentially leading to high packet loss rates and highly traffic-dependent performance.

ADVANTAGES OF THE INVENTION

It is an advantage of the invention according to the claims that it provides a switching arrangement respectively a switching method, requiring less connections than known arrangements while essentially maintaining the good performance. Since the virtual output queuing scheme serves for reducing the head-of-the-line blocking effect, a memory shared between the several input ports does not have anymore the effect it had without VOQ. In fact, with VOQ the output buffer has a much higher filling degree even in case of bursty traffic or conditions that lead to backpressure. The advantage of sharing is hence rendered negligible. The multiplication of the switching infrastructure, i.e. the output buffer and its environment, leads at first sight to an increase in hardware space, but in the end significantly reduces the necessary wiring. Taking an embodiment where the output buffer for each input port offers a number of N addresses, N being the number of input ports respectively output ports, the wiring is reduced by the factor of $N^2$. Realizing that each connection typically is a 16 bit bus connection, and using N=32, this adds up to $32*16*1024=524288$ connections with a fully shared output buffer and a reduction by 512 down to 1024 with the herein proposed arrangement. Since the output buffer space for each subset of input ports can be chosen according to the size of the subset, the output buffers for the subsets can be chosen smaller than the output buffer that was used for being shared among all of the input ports. For a total output buffer size of $N*N$ addresses this means that per input port an address space of N addresses is reserved and can be used also in the herein described arrangement for each output buffer. In an embodiment where for each single input port an own output buffer is arranged, this means theat each such output buffer would offer N addresses.

Even more, by multiplying the switch infrastructure, the address manager would only have to handle an address space that is N times smaller, hence using only half of the bits of a general address manager. The output queues could also be designed smaller, i.e. with less queuing places. The multiplication would hence in the end not result in a real multiplication in terms of space requirement. The above mentioned advantage in reduced wiring complexity is hence not counteracted by an increase in space requirement by doubling functional groups.

The choice is how big to choose the subsets. A subset can consist of a single input port, which results in an output buffer per input port, another choice could be to put two input ports together in one subset which then share their output buffer. Also nonuniform subsets can be formed like one subset consisting of one input port, another having two, another one four, whatever is believed to be practical. It seems most advantageous to choose all subsets of the same size, for the final layout is then uniform and less complicated. The optimum solution seems to be to have an output buffer per input port.

A common threshold comparator uniting the filling degrees of all output queues pertaining to one and the same output port is advantageous because, thereby the true traffic heading for this one output port is measured and used to create a feedback onto the input queues that leads to an effective traffic control in case of contention.

Distributing the feedback from the threshold comparator to the input queues in a selective way, namely only to those input queues that hold data packets for the corresponding output port where the contention has occurred, brings the advantage that not an unnecessary blocking effect is introduced by backpressure. Thereby the head-of-the-line blocking effect is avoided even in case of contention.

An output buffer backpressure generation is practical in that loss of data packets due to the output buffer being full is avoided.

Handling multicast data packets could be solved by storing the payload only once in the output buffer and entering the address thereof in the output queue of every output port, this data packet is heading for. A counter can be used that is decremented each time the address is read out from the output queue and which when reaching zero, enables the release of the address for further use.

Different input queues for handling different priorities allow data packets with higher priority to pass by those with lower priority.

When the output queues have more queuing places than the output buffer has addresses, a non-equal distribution between the various input queues can be handled without loosing data packets. A total unequal distribution could be buffered completely if each output queue has the number of queuing places equal to the number of addresses in the corresponding output buffer.

A way of handling multicast data packets is to put copies for each dedicated output port into the corresponding input queue and multiplexing those copies at the same time, if the output port status allows this.

Also in the input buffer 11, a system is feasible that only queues the headers and stores the payloads in a separate memory section, also referred to as common input buffer. In such a case, the payload of a multicast data packet needs only be stored once which saves memory space.

SUMMARY OF THE INVENTION

The invention proposes a switching arrangement for transporting data packets which comprise a section with data packet destination information and a payload section, to one or more output ports. The switching device is able to route the arriving data packets according to the data packet destination information, to at least one dedicated of the output ports. It comprises at each input port an input buffer with at least as many single input queues as there are output ports, and an input controller for each input port, serving for controlling the order of transmitting the data packets from the input queues of the corresponding input buffer to the switching device.

Each input port in the switching device has its separate output buffer for storing at addresses therein at least the payload of each data packet arriving at the input port.

Also for each input port in the switching device as many output queues as the switching arrangement has output ports are arranged. In these output queues least the address of each payload stored in the output buffer is stored, sorted according to the data packet destination information. The stored payload is then deliverable to its dedicated at least one output port under use of the stored addresses.

With other words, the output buffer is separated such that each input port has its own output buffer which is not reachable from the other input ports. Hence also the input router, serving for making the appropriate entries in the output buffer is reduced in its size in that it only has one input port to serve and accept the data packets respectively payloads from. Each input port also has its own set of output queues and its own output queue router for making the entries into the output queues.

The advantage arises that although the input ports do not share output buffer space, due to the use of virtual output queuing the probability that output buffer space is not effectively used by one input port and hence could be used by another input port is negligibly low. The target that every output port at any point in time shall have a data packet to send is hence maintained and not less fulfilled than with a complexer arrangement. However, due to the partitioning or splitting of the output buffer space, the number of necessary connections between the input buffer and the switching device is significantly reduced.

The above described concept is not restricted to the embodiment where each input port has its output buffer. Generally speaking, the total of input ports may be subdivided into any set of subsets of input ports which then have a common output buffer. The input ports grouped together as a subset may hence share the corresponding resources such as output buffer, address manager, output queue router, output queues and input router, all together referred to as switching section. E.g. pairwise the input ports can have only one common switching section. Already then a reduction in complexity can be observed while the performance is inprinciple if at all only negligibly influenced.

Thinking of an embodiment where the number of addresses is set to a total of N times the number of N input ports, the wiring complexity is reduced by the factor $N^2$ if each input port has its own switching section.

BRIEF DESCRIPTION OF THE DRAWINGS

Examples of the invention are depicted in the drawings and described in detail below by way of example. It is shown in FIG. 1 an input-buffered switch arrangement with a separate output buffer per input port and a set of output queues per input port, FIG. 2 an input-buffered switch arrangement with a separate output buffer per input port and only one set of output queues.

All the figures are for sake of clarity not shown in real dimensions, nor are the relations between the dimensions shown in a realistic scale.

DESCRIPTION OF THE PREFERRED EMBODIMENTS

In the following, the various exemplary embodiments of the invention are described.

Figure 1:
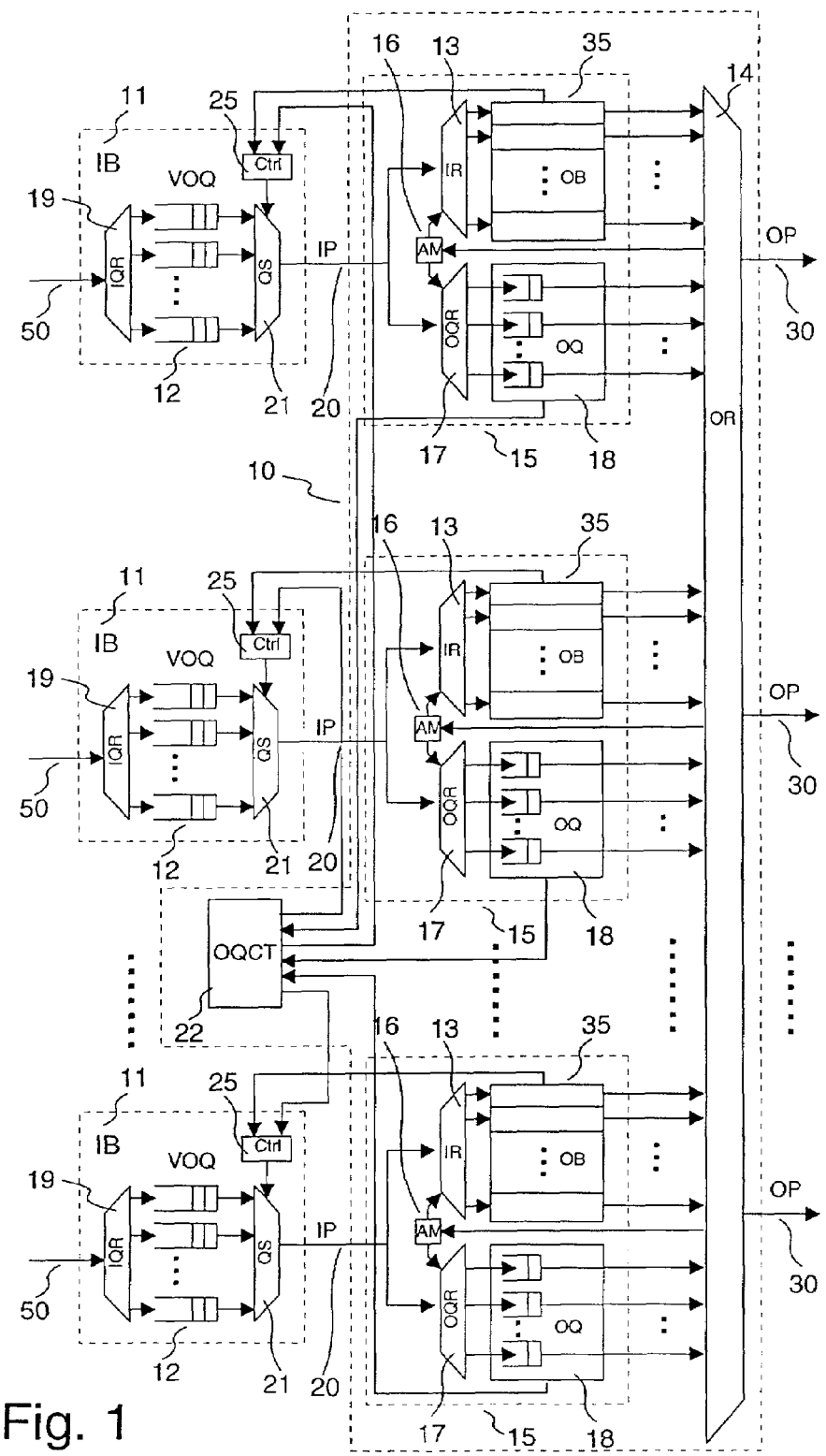

In FIG. 1 an input-buffered switching arrangement for handling data packets is shown. The arrangement comprises a switching device 10 with a number N of input ports 20 and a number N of output ports 30. At each input port 20, labelled with "IP", an input buffer 11, designated also with "IB", is arranged. Each input buffer 11 comprises an input controller 25, designated also with "Ctrl", which is itself connected to the switching device 10. The purpose is to lead the data packets, which arrive at the input buffer 11 via communication lines 50, and which are supposed to arrive at one or more of the output ports 30, to these output ports 30. From the output ports 30, the data packets can be delivered to subsequent devices, be it further switching devices or receiving devices, etc.

The data packets are divided up into a packet header section and a packet payload section. In the packet header section, data packet destination information is contained, telling to which of the output ports 30 the respective data packet is to be delivered. There exist two types of data packets with respect to their data packet destination information: unicast data packets and multicast data packets. A unicast data packet is a data packet that has only one of the output ports 30 as destination. In contrast hereto, a multicast data packet is destinated for more than one of the output ports 30. Hence, by definition, a multicast data packet is a data packet whose payload is destinated for several output ports 30. In the packet payload section of a data packet any data that is to be delivered to a destination can be contained.

The input buffers 11 are each split up into a multitude of input buffer queues, namely each input buffer 11 having exactly one input queue 12 for each output port 30. So each input buffer 11 comprises here N input queues 12. Each of these input queues 12 in one input buffer 11 serves for storing therein the arriving data packets for one dedicated output port 30. So the arriving data packets are sorted in each input buffer 11 according to their destination output port 30. Hence, if a unicast data packet heading for a certain output port 30 is blocked due to this output port 30 being busy, the only data packets that are blocked by this head-of-the-line-blocking unicast data packet are data packets heading for the same output port 30, while data packets heading for another output port 30 can be handled independently and be forwarded to the switching device 10 when the path towards their destination output port 30 is unoccupied. This sorting per destination is also referred to as Virtual Output Queuing, short VOQ. The multitude of the input queues 12 together is also referred to as VOQ.

For distributing the data packets arriving at the corresponding communication line 50 into the correct input queues 12 the input buffer 11 comprises a demultiplexer 19, also called input queue router IQR. For selecting the data packets from the input queues 12 and delivering them via the corresponding input port 20 to the switching device 10 the input buffer 11 comprises a multiplexer 21, also called queue selector QS. The multiplexer 21 selects one of the input queues 12 at any particular point in time and picks one data packet from that input queue 12, and sends it via its input port 20 to the switching device 10. The selecting process is controlled by the input controller 25 which gets its information therefor from the switching device 10. The input controller 25 does at a certain point in time signal to the multiplexer 21 whether it can send a data packet to the switching device 10 and if yes, from which input queue 12 to its output port 30 that data packet can be sent. The order of fetching the queued data packets from the several input queues 12 is first of all determined by the accessibility of the output ports 30, i.e. their occupation state. When an output port 30 is idle, it is ready to receive a data packet and this is signalled to the input controller 25. The input controller 25 represents the arbiter for selecting which data packet at which time to send from the input buffer 12 to the switching device 10.

In a different arrangement with a common output buffer, among the several input controllers 25 a policy would have to be applied which distributes between them the right to send the queued data packets to the switching device 10. In the here described arrangement however, each input buffer 11 has its own input router 13 which acts independently from the other input routers 13 and it has its own output buffer 35 which is independent from the other output buffers 35. Hence, due to the splitting up of the output buffer 35 and the input router 13, each input buffer 11 can forward its data packets to the output buffer 35 independently from the other input buffers 11. The only dependency between the different input buffers 35 concerns the backpressure mechanism, explained further below.

Multicast data packets can be distributed at the demultiplexer 19 by making an entry into each input queue 12 whose corresponding output port 30 is denoted in the data packet destination header. Here, simply the multicast data packet is copied and entered itself into each such input queue 12. This means that each multicast data packet heading for a number of n different output ports 30 is copied and queued such that n copies thereof reside in the input buffer 11 where the data packet arrived. On the side of the multiplexer 21 the principle of fetching only one data packet at a time can be altered in that for multicast data packets it is allowed to send several copies thereof to the switching device 10 at once. With other words, the disadvantage introduced by copying and distributing of a multicast data packet, which takes place at the demultiplexer 19, is countereffected by the advantage of merging several payload-equal packets into one forwarding process at the multiplexer 21. Alternatively, a multicast data packet can be stored only in one of the input queues 12 or in a separate multicast queue and be stored only once in the output buffer 35 and be read out nondestructively from there to all its destination output ports 30.

The switching device 10 comprises here a common output router 14 and for each input port 50 with its input buffer 11 a separate switching section 15. Each such switching section 15 comprises an output buffer 35, an input router 13, output queues 18, an output queue router 17, and an address manager 18.

Each of the input buffers 11 hence has its own input router 13, designated also with "IR", to which via the corresponding input port 20 the input buffer 11 is connected. At the output side of the input router 13, the output buffer 35, designated also with "OB", is arranged, which serves for all data packets coming from the input router 13. The output side of the output buffer 35 leads to the common output router 14, designated also with "OR". The routers 13, 14 provide here for each input port 20 the possibility to reach each output port 30 in a non-blocking way. Hence, at any point in time each input port 20 can send a data packet to any of the output ports 30, if such a data packet is arriving.

In parallel to the input router 13 and the output buffer 35, the output queue router 17 and the output queues 18 are arranged. The input port 20 hence leads via the output queue router 17 to the output queues 18 and from there to the output router 14. An address-manager 16, designated also with "AM", is arranged between the output router 14 and the input router 13 as well as between the output router 14 and the output queue router 17. For each output port 30 an output queue 18 is arranged, designated also with "OQ", which provides input to the output router 14 and receives input from the output queue router 17.

All data packets arriving from one input port 20 are routed via its input router 13 to its output buffer 35. The address manager 16 provides the input router 13 with the information at which place in the output buffer 35, i.e. at which address therein, the arriving data packets are to be stored. The information, at which address in the output buffer 35 each data packet that is heading for a specific output port 30 is stored, is written via the output queue router 17 into the output queues 18. This information is referred to as order information. For each data packet that is stored in the output buffer 35 such order information is put at one place in the output queue 18 belonging to the output port 30 where this data packet shall be sent to. These addresses are thereby sorted according to the corresponding output ports 30, i.e. those output ports 30 for which the packets stored at the respective addresses are heading. The sorting information, in which of the output queues 18 the respective address is to be put can be derived from the input buffer 11 since the same queueing principle already has been used there, just for the whole data packet. The setting of the queue selector 21 can hence be used as setting for the output queue router 17.

Each output port 30 can hence retrieve the stored addresses of the data packets, which shall arrive at that output port 30, from the respective output queue 18. The address manager 16 handles here simultaneously for each output queue 18 one address at each point in time. This means also that for each input port 20 one address is always held available, and this can be done already before the respective data packets arrive. Each data packet arriving head-of-the-line at an input port 20, hence finds an address where to be led by the input router 13.

This address is provided by the address-manager 16 also to the output queue router 17 which receives as further input pieces of data packet destination information which provide the mask for into which output queue 18 to enter the order information for all arrived data packets. The case of non-availability of addresses is discussed further below.

Every incoming data packet is hence given an address by the address manager 16, at which address this data packet is then stored in the output buffer 35, whereby the address is stored at a place in the output queue 18 corresponding to the output port 30, the data packet is heading for. The information therefor, i.e. the data packet destination information, can be derived from the packet header. The output router 14 serves for the final distribution, in that for each output port 30 it retrieves from the corresponding output queue 18 the next address and then fetches the data packet at that address and feeds it to the output port 30 that is the destination of that data packet.

The fetching step can be a non-destructive reading process, which allows for multicast data packets to be handled in that they are only once stored in the output buffer 35 but are read several times, until every output port 30 which has to receive this data packet, has received it. After reading of the data packet out of the output buffer 35, the respective address is released in that this address is fed back to the address manager 16, which can again assign this address to the input port 20 for handling the next arriving data packet. For multicast data packets a counter, not depicted in the drawing, can be used that upon storing the data packet is set to the number of output ports 30 this data packet is to be transmitted to, and is decreased each time this data packet is fetched by the output router 14. When the counter reaches the reading 0 for this data packet, the corresponding address can be released for being reused.

For handling multicast data packets, with each memory location, an occupation counter may be kept. These counters are initialized to zero. When a data packet arrives, the address manager will provide a free address if one is available, and the data packet will be stored at that location; otherwise, the data packet will be dropped in its entirety. The corresponding occupation counter is set to the number of destinations requested by the data packet's header. The address is appended to each VOQ to which the data packet is destinated.

When an address is selected by the output router 30, the corresponding data packet is transmitted from the memory. The address itself is returned to the address manager, along with a count determined by the output router 30 indicating the number of destinations the data packet is being transmitted to in the current cycle. The address manager 16 decreases the occupancy counter by this number. If the counter reaches zero, indicating that the data packet has been delivered to all its destinations, the address is returned to the free pool.

In the case of having several switching sections 15, i.e. several sets of output queues 18, there might be added an output queue arbitration unit, not depicted in the figure, which for one single output port 30 decides which of its dedicated output queues 18 is at a certain point in time allowed to send its entry to that particular output port 30. Such an output queue arbitration unit can also be designed to handle the arbitration for several if not all output ports 30.

The principle of sharing the output buffer 35 is insofar introduced in that the output queues 18 in total have more logical queuing places than the output buffer 35 has physical addresses. By this measure, an asymmetry in the distribution of data packets among the input queues 12 can be buffered. As long as the total traffic of the data packets does not exceed the real maximum capacity of the output buffer 35, the performance will increase, since the arrangement is much more flexible concerning extreme traffic pattern change. Particularly bursty traffic can be handled better, since the probability of data packet loss is reduced by allowing an input queue 12 to use more output buffer space than its fair share thereof would offer.

Each input port 20 has its input buffer 11 with virtual output queuing, i.e. with the input queues 12 for each output queue 18 in each input buffer 11. The input buffers 11 are connected to their own input router 13. Each input buffer 11 has also its own input controller 25 for controlling the order of outgoing data packets from the different input queues 12 of that input buffer 11. Each input controller 25 works independently from the other input controllers 25.

The independence of the input controllers 25 reduces significantly the complexity of the overall controlling resources. Each input controller 25 here need only handle the arriving data packets according to a predetermined decision policy which might be a round robin policy, a round robin policy with fairness and priority-level precedence or any other policy like OCF, FIFO, LRU or the like. Each of the input controllers 25 individually decides which of the data packets it has stored will be sent to the input router 13 next.

A feedback mechanism is arranged which serves for signaling to the input buffers 11, if the total of the output queues 18 of one specific output port 30 is full, i.e. a certain threshold value for the filling degree of all output queues 18 for this output port 30 has been exceeded. Therefore an output queue threshold comparator 22, also designated with OQCT, is arranged which collects all filling degrees of those output queues 18 which belong to one single output port 30. The cumulated filling degree is the correct measure for the number of all data packets in the switching arrangement that are directed towards a specific output port 30. This cumulated number is hence to be measured against one or more predetermined thresholds which is done in the output queue threshold collector 22. In the case the threshold is exceeded, ths above mentioned signal is generated and forwarded to the input controllers 25.

Upon this signal, each input controller 25 can react in that data packets heading for this output port 30 are no longer sent from the input buffers 11, i.e. the data packets from the input queues 12 for the occupied output queue 18 are held back, while the other input queues 12 can continue sending data packets.

The backpressure scheme can as well be substituted by its negative equivalent, i.e. signaling whether an output queue 18 is still able to receive further entries.

A further improvement can be achieved by feeding back to the input controllers 25 a signal that gives the input controllers 25 more detailed information about the filling degree of the total of the output queues 18. Since it is the target to have at any moment in time at any output port 30 a data packet to deliver to a subsequent stage, the information that a total of output queues 18 belonging to one common output port 30, in the following referred to as set of output queues 18, is empty or almost empty can be fed to the input controllers 25 and be used to preferably send to the input routers 13 those data packets which head for the respective output port 30. The status information of the output queues 18 can e.g. be derived by introducing one or several additional threshold values, e.g. a threshold value at a filling degree 0 or close to 0. An empty or almost empty set of output queues 18 will hence be reported to the input controller 25, which should then adopt his policy in a way, that an output queue 18 of this set receives a data packet as soon as possible. Introducing several such threshold values allows a fine-grained status report to the input controllers 25 which can use this status report for each of the sets of output queues 18 to influence their data packet multiplexing policy accordingly. This status report hence functions as sort of opposite of the backpressure, hence as low-load alarm or load-maximizing scheduling feedback signal.

The backpressure signal can here be propagated selectively to the input buffers 11, namely the backpressure signal originating in the output queues 18 for one specific output port 30 is only guided to the corresponding input queue 12 in the input buffers 11, respectively input queues 12 in the case of multiple priorities. Hence, all other input queues 12 are not blocked by this backpressure and can continue sending their data packets to the output buffers 35.

Since the input buffers 11 can more easily be physically separated from the switching device 10 due to the smaller number of connection lines between the input buffers 11 and the switching device 10, the input buffers 11 can be realized with cheaper memory chips, and hence their buffer size can in reality be chosen much larger than its could be for the output buffers 35 at the same price. Hence with this scheme, the finite input buffers 11 represent a better approximation to the theoretical infinite input buffers 11.

To achieve a correct handling of the data packets, a flow-control mechanism for the data packets is added also for the output buffer 35, performed by a not depicted output buffer backpressure generator, which creates a signal outgoing from the output buffer 35 to its input buffer 11, which signal signals to the input buffer 11 that the output buffer 35 is no longer able to buffer arriving data packets and hence the input buffer 11 is prevented from sending further data packets to the output buffer 35, until the backpressure induced by the signal has disappeared. The backpressure signal is created when the amount of data packets buffered in the output buffer 35 exceeds a predetermined threshold. This threshold is set lower than the actual size of the output buffer 35 in order to be able to buffer those data packets that may be sent during the time which the backpressure signal needs to effect the backpressure in the input buffer 11. Since in the case of sharing, the sum of the number of places of all output queues 18 in one switching section 15 is bigger than the number of addresses in the output buffer 35, the output buffer 35 can be filled up although no output queue 18 is reaching its threshold value for the therein stored data packets. Hence, the output buffer 35 also has a threshold value for occupied addresses, which when reached effects the creation of a memory-full-backpressure signal, to the input buffer 11 which in that case, has to stop sending its data packets to the output buffer 35 via the input router 13. As soon as the number of occupied addresses falls below the threshold value, normal operation can be resumed. The mechanism that creates backpressure whenever that output buffer 35 runs out of space is provided for each single output buffer 35 separately.

This arrangement allows for all input buffers 11 to send their data packets independently via their input router 13, whenever the output queue 18 for this data packet and the common output buffer 35 still hold enough space therefor, i.e. no backpressure signal has been generated.

The input buffer 11 with virtual output queuing can here also be realized using an additional common input buffer, not depicted here, with or without sharing. This means that the arriving data packets can be stored in the common input buffer while their addresses therein are stored in the input queues 12, ordered according to the output ports 30 where these data packets are heading. The addresses hence represent the entries for the data packets that are entered into the input queues 12. For multicast data packets only one entry in the common input buffer need be made, whereby in every input queue 12 which corresponds to an output port 30 the multicast data packet is heading for an entry is made. This entry in the input queues 12 is a pointer to the location where the multicast data packet or its payload is stored in the common input buffer. These entries are hence identical for multicast data packets and since the payload need only be stored once, memory space is saved. For implementing the common buffering of the payloads, the same elements, here not depicted, as used for the output buffer 35 may be used, i.e. an address manager and an input router for delivering the payloads to the common input buffer. The demultiplexer 19 plays a somehow similar role for the input queues 12 as does the output queue router 17 for the output queues 18.

The input buffers 11 are typically arranged in form of switch adapters, also called input adapters or simply adapters. In the proposed invention, scaling the arrangement, also referred to as switch fabric, from e.g. 16×16, i.e. 16 input ports 20×16 output ports 30, to 32×32, all adapters need only change their queuing structure, but not their on-adapter input buffer 11. With proper foresight, this means that the actual number of linked-lists to manage this input buffer 11 as a collection of input queues 12 should be made programmable. Anyway, on the input adapter the complexity scales with the order of N, i.e. doubling the destinations means doubling the number of input queues 12 and output queues 18. With the classical VOQ-arrangement, doubling the number of switch input ports 20 and output ports 30 requires a square increase of requests, i.e. a 16×16 controlling means receives 256 requests, a 32×32 controlling means 1024 requests.

Figure 2:
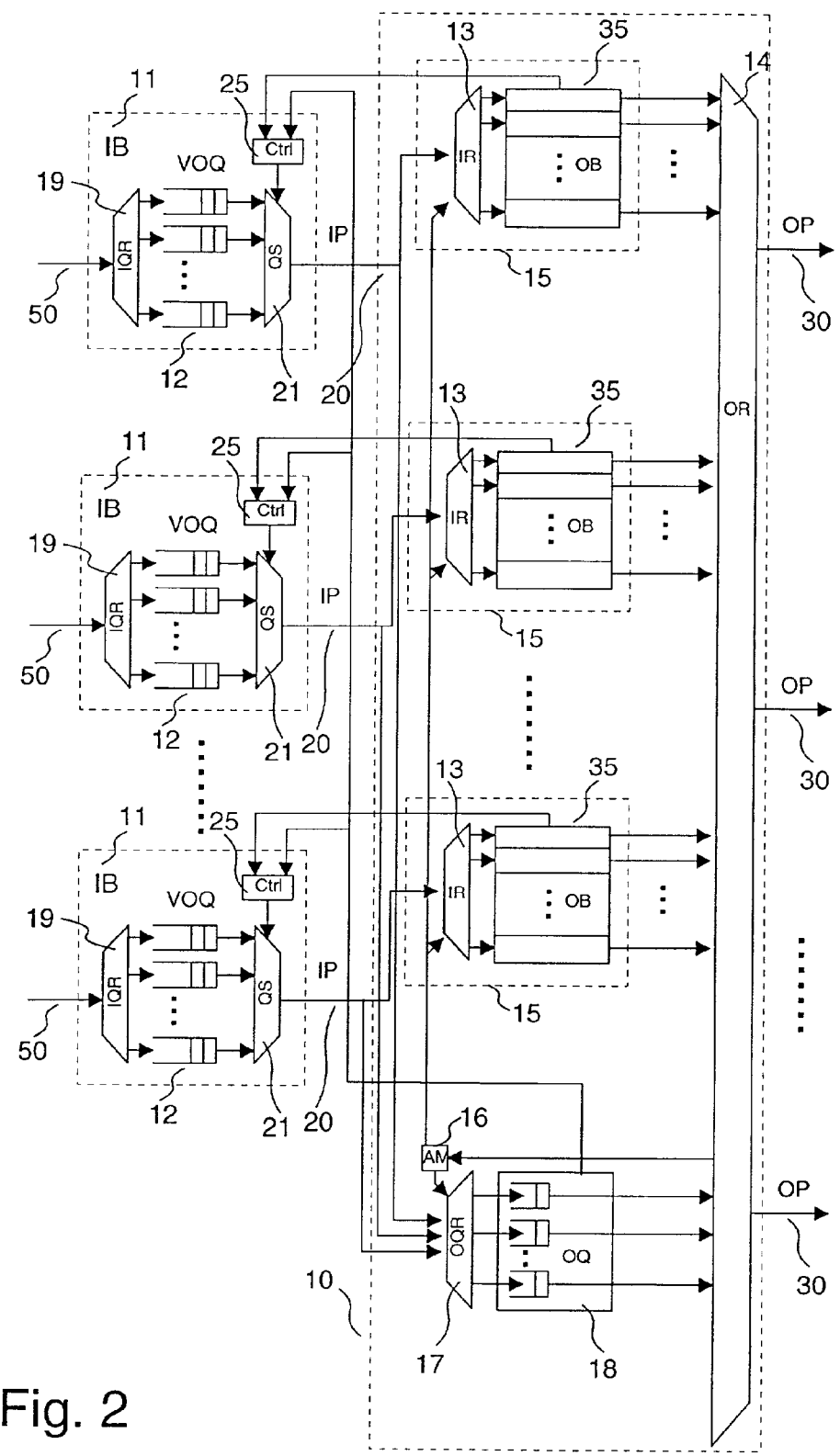

Another embodiment of the invention is depicted in FIG. 2. It differs from the above described embodiment in that the address manager 16, the output queue router 17 and the output queues 18 are shared among the input ports 20. This means, that while the input ports 20 each have their own input router 13 and output buffer 35, there is only one set of output queues 18 that are filled via a common output queue router which is fed by the single address manager 16 and also gets input from each of the input buffers 11. The output queues 18 deliver their filling degree signals to the input controllers 25 where in case of output queue contention a backpressure signal is generated. Again, backpressure can be substituted by the above described grant mechanism. The OQCT 22 is here no longer necessary, since no adding up of different filling degrees is needed. The address manager 16 delivers its addresses to all the input routers 13, one at a time for each input router 13. Of course, this address manager 16 manages the addresses of all output buffers 15 and hence gets the feedback, which addresses can be reused, from the output router 14. The output router in this case not only gives information about an address to the address manager 16 but also the identity of the corresponding output router 35. Alternatively the address space of all output buffers 35 together can be set up such that no address appears twice. Then, no managing of several overlapping address spaces is necessary. The address manager can send the next address to be used to all input routers 13 at once, where each input router 13 recognizes, whether the arriving address is an address that may be used by that input router 13, or whether that address is determined to be used by another input router 13. Also this embodiment may be varied in that any arrangement between the just described embodiment with only one set of output queues 18 and the first described embodiment with such a set of output queues 18 for each of the input ports 20 may be used. Two or more input ports 20 may hence share one address manager 16, output queue router 17 and output queues 18.

The performance of the switching arrangement can be increased in various ways. For the increase of number of input- and output ports, the switching arrangement can be arranged in a multistage or in a singlestage arrangement. In the multistage arrangement, the number of needed switching arrangements grows slower than in a comparable singlestage arrangement, i.e. with growing number of ports a multistage arrangement needs fewer switching arrangements than a singlestage arrangement.

However, the performance of a multistage arrangement is lower because of increased latency and because of the possibility of backpressure due to total use of an output queue by one connection which prevents processing of data packets with other destinations or a total use of the packet memory which blocks all switching arrangement input ports and propagates towards the preceding stage. This lower performance can to a certain extent be compensated by a speedup factor. This means that the switching arrangement is running at a higher speed than its environment. Then, an output buffer is needed behind the switching arrangement to queue the faster incoming data packets which are sent out from the last stage and are to be passed over to the following hardware environment at a lower speed. Another possibility is to increase switch-internal memory, such that total use is less likely. Such bigger memory is however extremely expensive and to some extent also physically limited. Increasing switch memory by the memory expansion mode avoids the physical limit but is nevertheless expensive. If in a multistage arrangement a subsequent switching arrangement is crowded (output memory is full, i.e. no address available, or output queue is full), a backpressure signal can be generated for all input ports, which backpressure signal is again transferred to all preceding switching arrangements. In the case of full output queues, the backpressure can be selectively blocking only data packets heading for the full output queue. In the case of full output buffer, all input ports are to be blocked. The backpressure signal blocks the preceding switching arrangement in that this switching arrangement can no longer send cells.

The herein presented switching arrangement is scaleable with any of the known expansion methods, e.g. known from the PRIZMA architecture mentioned in the chapter introducing background art. Hence speed expansion, port expansion, link-paralleling, and finally any combination thereof, are applicable. The described embodiments are combinable in part or in a whole in order to achieve a suitable switching device which combines switching speed, low latency, high throughput and low wiring and circuitry complexity.

In the claims, the case where several output buffers share one set of output queues 18, one output queue router 17 and one address manager 16 is differentiated from the case when each output buffer 35 has its own set of output queues 18, output queue router 17 and address manager 16 by giving both forms, i.e. singular and plural case of output buffers 35.

What is claimed is:

1. Switching arrangement for transporting data packets that comprise data packet destination information and a payload, said data packets heading via one or more input ports of a switching device towards one or more output ports thereof, said switching device being able to route said arriving data packets according to said data packet destination information to at least one dedicated of said output ports, whereby the total of all input ports is divided into subsets of input ports, each subset comprising at least one said input port, said switching arrangement comprising at each input port an input buffer with at least as many input queues as said switching arrangement has output ports, said input queues serving for sorting said arriving data packets according to their dedicated at least one output port, and an input controller for each input port, serving for controlling the order of multiplexing said data packets from said input queues to said switching device, for each subset of said input ports in said switching device a separate output buffer for storing at addresses therein at least said payload of each said data packet arriving at said input port, and at least one set of as many output queues as said switching arrangement has output ports, for storing therein, sorted according to said data packet destination information, at least said address of each said payload stored in said output buffer, whereby said stored payload is deliverable to its dedicated at least one output port under use of said stored addresses.

2. Switching arrangement according to claim 1, characterized in that an output-queue threshold comparator is provided for signaling to the input buffers if a threshold value of occupied places in the total of all output queues pertaining to one common output port has been exceeded.

3. Switching arrangement according to claim 2, characterized in that upon a signal from the threshold comparator that the threshold value of occupied places in the total of all output queues pertaining to one common output port has been exceeded, said input buffers are designed such that only the input queue which corresponds to said common output port is prevented from delivering its data packets to said common output port.

4. Switching arrangement according to claim 1, characterized in that for each output buffer an output buffer backpressure generator is provided for signaling to the input buffers of the subset of input ports corresponding to the output buffer that a threshold value of occupied addresses in the output buffer has been exceeded.

5. Switching arrangement according to claim 1, further comprising at least one address manager for managing the use of said addresses of said output buffers, or output buffer, and at least one output queue router for entering said addresses at which said data packets are stored in said output buffers or output buffer, into said output queues.

6. Switching arrangement according to claim 5, characterized in that for a multicast data packet the address thereof is enterable as an entry in each of the output queues for the output ports this multicast data packet is intended to reach and that said address is only releasable by the address manager for use for another data packet, when all entries of said multicast data packet have been successfully used for delivering said multicast data packet to its designated output ports.

7. Switching arrangement according to claim 1, characterized in that for data packets with different handling-priorities, for each class of priority and for each output port a separate input queue is provided in the input buffer.

8. Switching arrangement according to claim 1, characterized in that the output queues provide in total more queuing places for the addresses than the corresponding output buffers have, respectively corresponding output buffer has addresses.

9. Switching arrangement according to claim 1, comprising for delivering at least said payload from said output buffers to said output ports a common output router, connecting all output buffers with all output ports.

10. Switching arrangement according to claim 1, comprising a demultiplexer for making for each of said arriving data packets an entry into those of said input queues, which are identified in said packet destination information of the corresponding data packet, whereby each said input controller is designed to allow simultaneous transmission of those data packets whose entries are located in different of said input queues and who have identical payload.

11. Switching arrangement according to claim 10, characterized in that each said entry comprises at least the payload of the corresponding data packet or a pointer to a memory cell wherein at least the payload of the corresponding data packet is stored, said memory cell preferably being located in a common input buffer.

12. Switching arrangement according to claim 11, characterized in that for the case said data packet being a multicast data packet, the demultiplexer is designed to make several entries in said input queues and only one entry of the payload thereof in a said memory cell.

13. Switching method for data packets heading via one or more input ports of a switching device towards one or more output ports thereof, the total of all input ports being divided into subsets of input ports, each subset comprising at least one said input port, said method comprising the steps of
sorting said data packets according to their dedicated at least one output port, at each input port into input queues of an input buffer which has at least as many input queues as said switching device has output ports,
multiplexing said data packets from said input queues to said switching device,
storing at addresses in a separate output buffer which exists per subset of said input ports in said switching device at least said payload of each said data packet arriving at said input port,
storing at least said address of each said payload stored in said output buffer in output queues which exist at least once in said switching device, sorted according to said data packet destination information,
delivering said stored payload to its dedicated at least one output port under use of said stored addresses.

14. Switching method according to claim 13, comprising the step of signaling to the input buffers if a threshold value of occupied places in the total of all output queues pertaining to one common output port has been exceeded.

15. Switching method according to claim 13, characterized in that upon a signal that the threshold value of occupied places in the total of all output queues pertaining to one common output port has been exceeded, in said input buffers only the input queue which corresponds to said common output port is prevented from delivering its data packets to said common output port until the number of occupied places has decreased.

16. Switching method according to claim 13, comprising the step of signaling to the input buffers of a said subset of input ports that a threshold value of occupied addresses in the corresponding output buffer has been exceeded.

* * * * *